(12) United States Patent
Dichenko (10) Patent No.: US 10,991,082 B2
(45) Date of Patent: Apr. 27, 2021

(54) DETERMINING AN OPTIMALITY COEFFICIENT OF AN IMAGE

(71) Applicant: Mikhail Dichenko, Saint-Petersburg (RU)

(72) Inventor: Mikhail Dichenko, Saint-Petersburg (RU)

(*) Notice: Subject to any disclaimer, the term of this patent is extended or adjusted under 35 U.S.C. 154(b) by 57 days.

(21) Appl. No.: 16/548,119

(22) Filed: Aug. 22, 2019

(65) Prior Publication Data
US 2021/0056669 A1   Feb. 25, 2021

(51) Int. Cl.
*G06T 5/00* (2006.01)
*G06K 9/62* (2006.01)
*G06K 9/00* (2006.01)

(52) U.S. Cl.
CPC .......... *G06T 5/009* (2013.01); *G06K 9/00744* (2013.01); *G06K 9/6212* (2013.01); *G06K 9/6267* (2013.01)

(58) Field of Classification Search
CPC .. G06T 5/009; G06K 9/6267; G06K 9/00744; G06K 9/6212
USPC ........................................................ 382/274
See application file for complete search history.

(56) References Cited

U.S. PATENT DOCUMENTS

| | | | |
|---|---|---|---|
| 5,949,918 A * | 9/1999 | McCaffrey | G06T 5/009 382/274 |
| 7,474,338 B2 | 1/2009 | Sato | |
| 7,869,649 B2 | 1/2011 | Watanabe | |
| 2006/0039586 A1* | 2/2006 | Takematsu | G06F 16/48 382/115 |
| 2009/0051794 A1* | 2/2009 | Ando | H04N 5/20 348/274 |

FOREIGN PATENT DOCUMENTS

EP         0723364 B1      4/2000

* cited by examiner

*Primary Examiner* — Ayodeji O Ayotunde
(74) *Attorney, Agent, or Firm* — Arent Fox LLP (57) ABSTRACT

A method for determining an optimality coefficient includes receiving an image including a plurality of pixels. A characteristic function is selected for analyzing the received image. Distribution of the plurality of pixels of the received image is analyzed using the selected characteristic function. The analyzed distribution of the plurality of pixels is compared with a normal probability distribution function. An optimality coefficient value for the received image is generated based on the results of the comparison.

18 Claims, 7 Drawing Sheets

DETERMINING AN OPTIMALITY COEFFICIENT OF AN IMAGE

BACKGROUND

The present invention relates to image processing techniques, and more specifically, to a method and apparatus for determining an optimality coefficient of an image.

Image capture devices (such as digital cameras) typically work in RGB (red green blue) color space, and each sensor will have its own color response characteristics. In other words, digital images consist of a plurality of pixels. The RGB (Red, Green, Blue) color model is the well-known model. The RGB model defines a color space in terms of three components: Red (ranges from 0-255), Green (ranges from 0-255) and Blue (ranges from 0-255). The HSV/B (Hue, Saturation, Value/Brightness) color model defines a color space in terms of three constituent components: Hue (ranges from 0 to 360°), Saturation (ranges from 0 to 100) and Brightness (or Value) (ranges from 0 to 100). The CIELAB model (also known as simply LAB) also defines a color space in terms of three components: L (lightness from black to white), A (lightness from green to red) and B (lightness from blue to yellow).

SUMMARY

Embodiments of the present invention are directed to a method for determining an optimality coefficient. A non-limiting example of the method includes receiving an image including a plurality of pixels. A characteristic function is selected for analyzing the received image. Distribution of the plurality of pixels of the received image is analyzed using the selected characteristic function. The analyzed distribution of the plurality of pixels is compared with a normal probability distribution function. An optimality coefficient value for the received image is generated based on the results of the comparison.

In one or more other exemplary embodiments, a system for determining an optimality coefficient is disclosed. The system includes at least one memory storing computer-executable instructions and at least one processor configured to access the at least one memory and execute the computer-executable instructions to perform a set of instructions. The instructions include receiving an image including a plurality of pixels. A characteristic function is selected for analyzing the received image. The instructions further include analyzing distribution of the plurality of pixels of the received image using the selected characteristic function. The analyzed distribution of the plurality of pixels is compared with a normal probability distribution function and an optimality coefficient value for the received image is generated based on the results of the comparison.

Embodiments of the present invention are directed to a computer-program product for determining an optimality coefficient. The computer-program product including a computer-readable storage medium having program instructions embodied therewith. The program instructions are executable by a processor to cause the processor to perform a method. A non-limiting example of the method includes receiving an image including a plurality of pixels. A characteristic function is selected for analyzing the received image. Distribution of the plurality of pixels of the received image is analyzed using the selected characteristic function. The analyzed distribution of the plurality of pixels is compared with a normal probability distribution function. An optimality coefficient value for the received image is generated based on the results of the comparison.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

As described previously, image capture devices typically work in RGB color space, and each sensor will have its own color response characteristics. Embodiments of the present invention are directed to a novel techniques of image analysis that determine an optimality coefficient. Embodiments of the present invention are further directed to image improvement techniques based on the determined optimality coefficient. The optimality coefficient may have a wide range of values (e.g., from 0 to 1000). The values of optimality coefficient are indicative of how close a particular image is to an optimal image. The term "optimal image" refers to the highest degree of perceived pleasantness of an image without taking into consideration semantic content of the image. An image can be, for example, a landscape of mountains or the sea, a beach, and the like. Some people may prefer a seascape, while others may prefer to look at mountains. Some people may like the combination of blue and white colors more, while others prefer the combination of green and yellow. Advantageously, when analyzing images of the same type and similar color combinations, the disclosed technique can identify the preferred choice of most people viewing the images. For example, a person who loves the scenery of the sea may choose one out of 10 enjoyable seascapes. It has been shown that the value of the optimality coefficient calculated according to embodiments of the present invention coincides by 70%-80% with the choices of most people.

It should be noted, the law of normal distribution (Gauss function) shows its effect in assessing the pleasantness-unpleasantness of an image by most people. Embodiments of the present invention contemplate application of the well-known normal distribution function to digital image analysis process. The novelty of various embodiments of the invention lies in the analysis approach to digital image, sound file and video file as to a set of values that is large enough for the law of normal distribution to show its effect. The novelty of various embodiments of the present invention is manifested in determining the parameters of the expected value and the variance based on the actual distribution of pixels according to the selected characteristic of the image. Next, the determined parameters are applied to the normal distribution formula to determine normal distribution values corresponding to the selected characteristic. According to embodiments of the present invention, the analyzed distribution of the plurality of pixels is compared with a normal probability distribution function. In other words, the disclosed technique, at the initial stage, analyzes the distribution of pixels of an actual image, then adjusts the normal distribution for it, and determines the difference between the two distributions at the final stage. The disclosed method solves a complex problem, which seems contradictory and impossible to solve at first glance. On the one hand, each image is unique; it is very difficult to find a universal approach to utilize for assessments of various images having different characteristics and types. On the other hand, people are capable of evaluating and comparing all kinds of images, sounds or videos using a variety of criteria, such as, but not limited to, acceptability, pleasantness and desirability. Moreover, people are capable of performing this process very quickly. Advantageously, embodiments of the present invention automate the complex mechanism behind this process.

A comparison of the actual distribution of the plurality of pixels using the selected characteristic (such as lightness (L) from the CIELAB model) and Saturation (S) from the HSV/B) model) with the normal distribution reveals the degree of difference between the respective distributions. This difference between the respective distribution comprises the coefficient of optimality. With respect to two image characteristics with a positive correlation (L, S), the smaller the difference is between the normal distribution and the actual distribution of the pixels, the more pleasant the image is in the assessment of most people. In other words, an image approaching normal distribution in lightness and saturation is pleasing to most people. The disclosed embodiments analyze an image as a set of pixels, each of which is classified based on the selected characteristic into the group that corresponds to the value of the selected characteristic. This classification is used for determining the coefficient of optimality, as disclosed herein.

There are two generally accepted types of human perception of colors: warm colors and cold colors. These groups of colors have the opposite effect on the human nervous system. Warm colors excite the human nervous system, while cold colors soothe it, due to their different physical nature. Colors are electromagnetic waves reflected from the carrier. In one embodiment of the present invention, another image characteristic—TH (Toning Hue) may be used for determining the coefficient of optimality, as disclosed herein.

Figure 1:
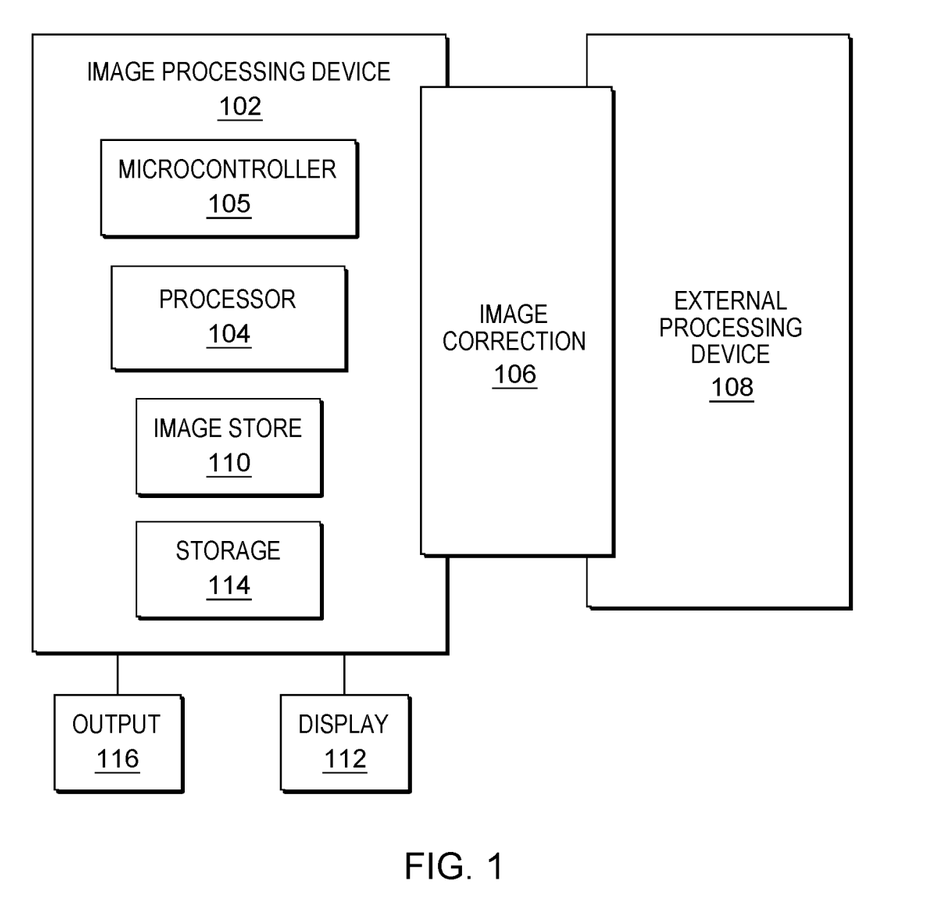
FIG. 1 is a block diagram of an image processing apparatus operating in accordance with an embodiment of the present invention.

FIG. 1 is a block diagram of an image processing device 102 operating in accordance with an embodiment of the present invention. It will be appreciated that many of the processes implemented in the image processing device 102 are implemented in or controlled by software operating on a microprocessor, central processing unit, controller, digital signal processor and/or an application specific integrated circuit, collectively depicted as processor 104. All user interface and control of peripheral components such as buttons and display is controlled by a microcontroller 105.

In operation, the processor 104, in response to receiving one or more images, initiates and controls the image analyzing process. A characteristic function for analyzing the received image is determined, for example, based on a user input. The one or more images analyzed by the image processing device 102 may be stored in an image store 110 which may comprise computer memory such a dynamic random-access memory or a non-volatile memory. The image processing device 102 may be equipped with a display 112, such as an LCD, both for displaying analyzed images and displaying a user interface for control software of the image processing device 102.

According to an embodiment, the image processing device 102 further comprises an image correction module 106. The image correction module 106 may be arranged for off-line correction of analyzed images in an external processing device 108, such as a desktop computer, a color printer or a photo kiosk. In this embodiment, the processor 104 receives the digital image (e.g., captured high resolution digital image) from the image store 110 and analyzes it to determine an optimality coefficient of an image. The analysis is performed as described in the embodiments to follow. If image optimization is requested, the image correction module 106 can modify the image based on the determined coefficient of optimality. The modified image may be either displayed on image display 112, saved on a persistent storage 114 which can be internal or a removable storage such as CF card, SD card or the like, or downloaded to another device via image output means 116 which can be tethered or wireless. The image correction module 106 can be brought into operation either automatically each time an image is processed. Although illustrated as a separate item, where the image correction module 106 is part of the image processing device 102, it may be implemented by suitable software on the processor 104. It should be noted that the scope of the invention is not intended to be limited to any particular implementation using technology either now known or later developed in the future.

Figure 2A:
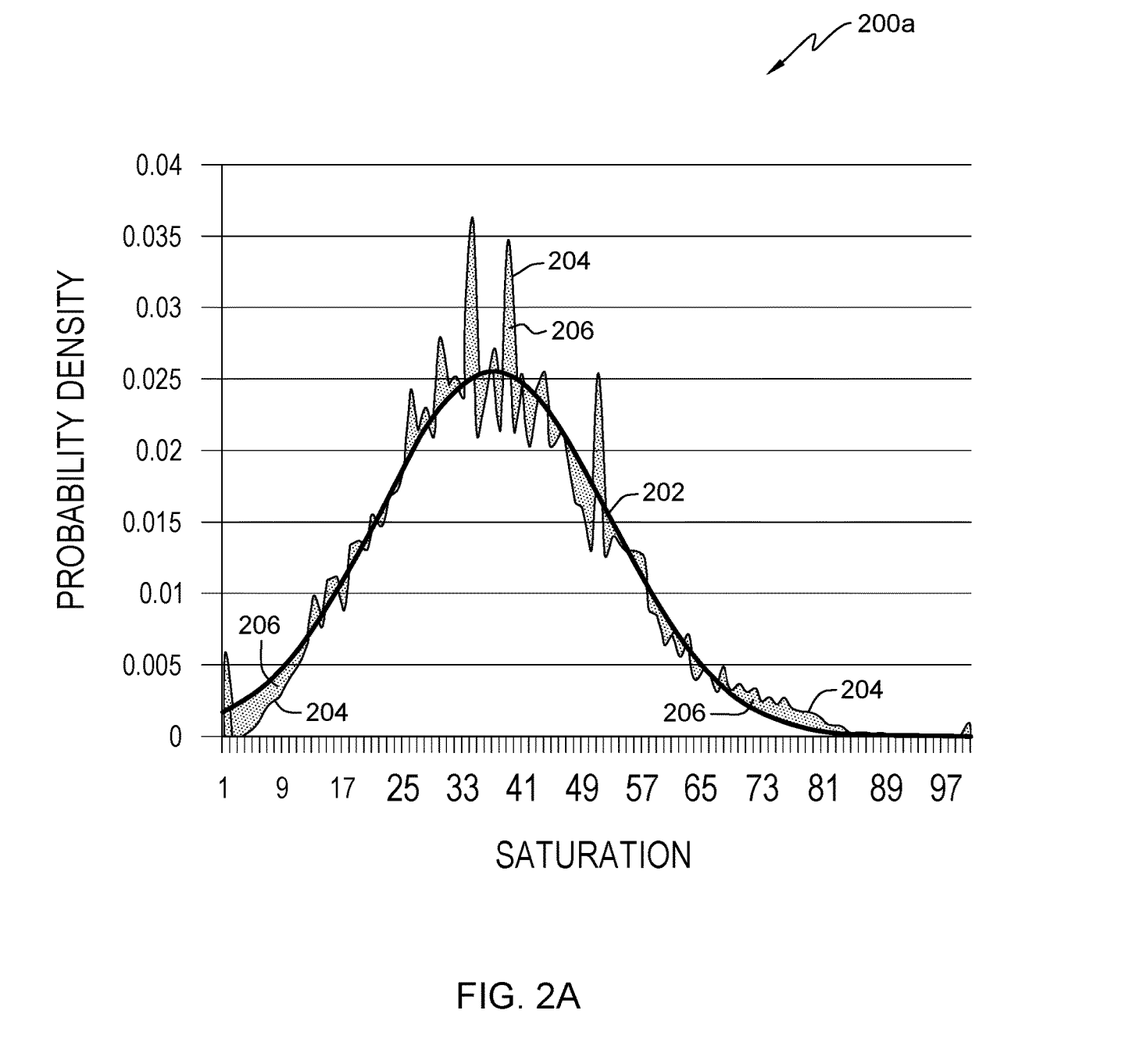
FIGS. 2A and 2B are diagrams illustrating comparison of the analyzed distribution of the plurality of image pixels with a normal probability distribution function, in accordance with embodiments of the present invention.

FIGS. 2A and 2B are diagrams illustrating comparison of the analyzed distribution of the plurality of image pixels with a normal probability distribution function, in accordance with embodiments of the present invention. More specifically, FIG. 2A illustrates comparison of the actual distribution of the plurality of image pixels 204 to a normal probability distribution function 202. In a diagram 200a, the analyzed image is a famous painting of Leonardo Da Vinci—Madonna Litta. The distribution functions 202 and 204 represent relationships between the probability density and one of the image characteristics—saturation. The diagram 200a further illustrates a difference 206 between the actual distribution of the plurality of pixels 204 and the normal probability distribution 202. Various experiments have shown that the correlation between the optimality coefficient and the subjective selection of the viewers based on the saturation characteristic is about 85% for portraits.

Figure 2B:
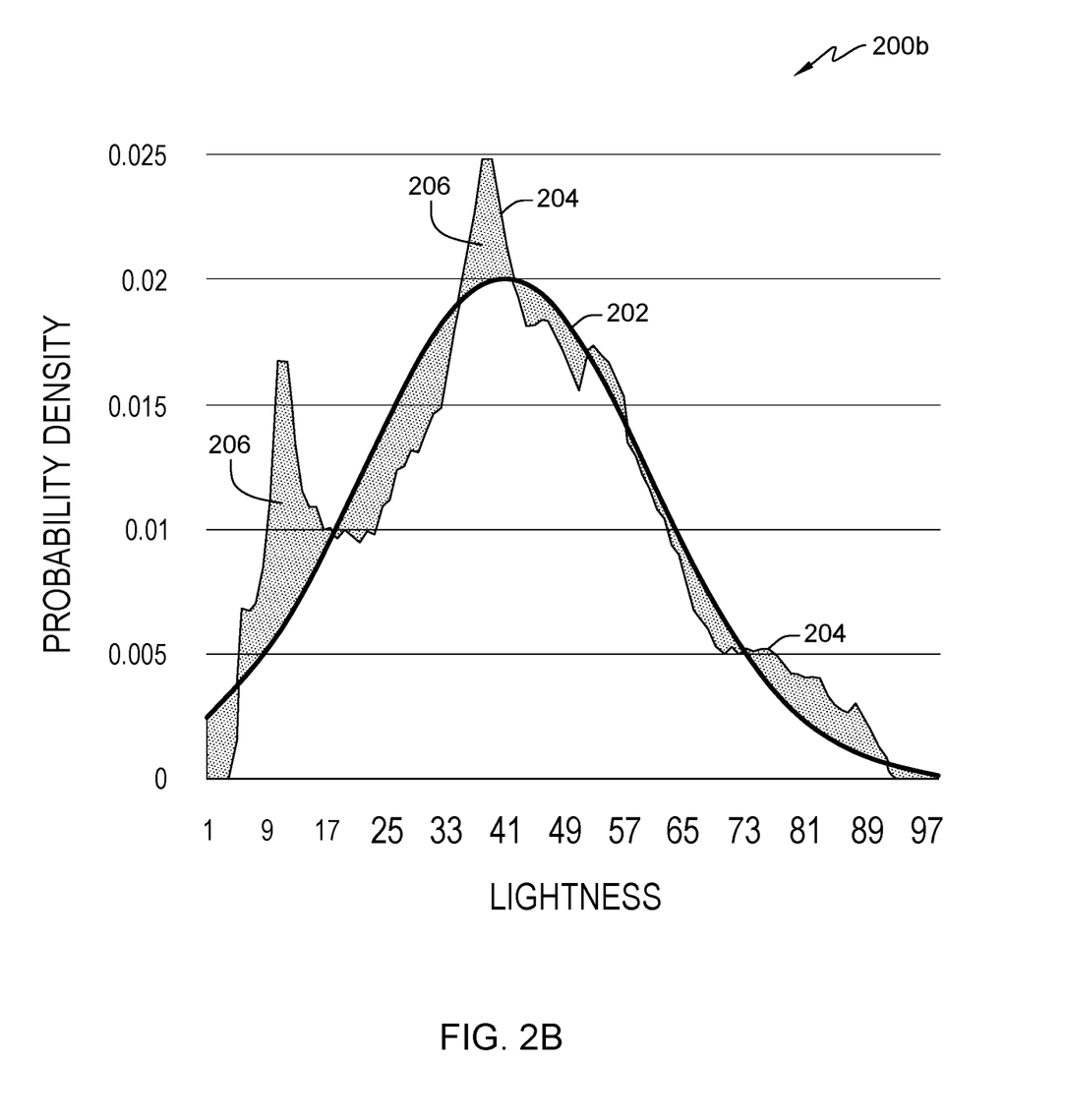

In a diagram 200b in FIG. 2B, the analyzed image is an abstract painting by Kandinsky. The distribution functions 202 and 204 represent relationships between the probability density and another one of the image characteristics—lightness. The diagram 200b also illustrates a difference 206 between the actual distribution of the plurality of pixels 204 and the normal probability distribution 202. Various experiments have shown that the correlation between the optimality coefficient and the subjective selection of the viewers based on lightness characteristic is about 71% for abstract images.

Figure 3:
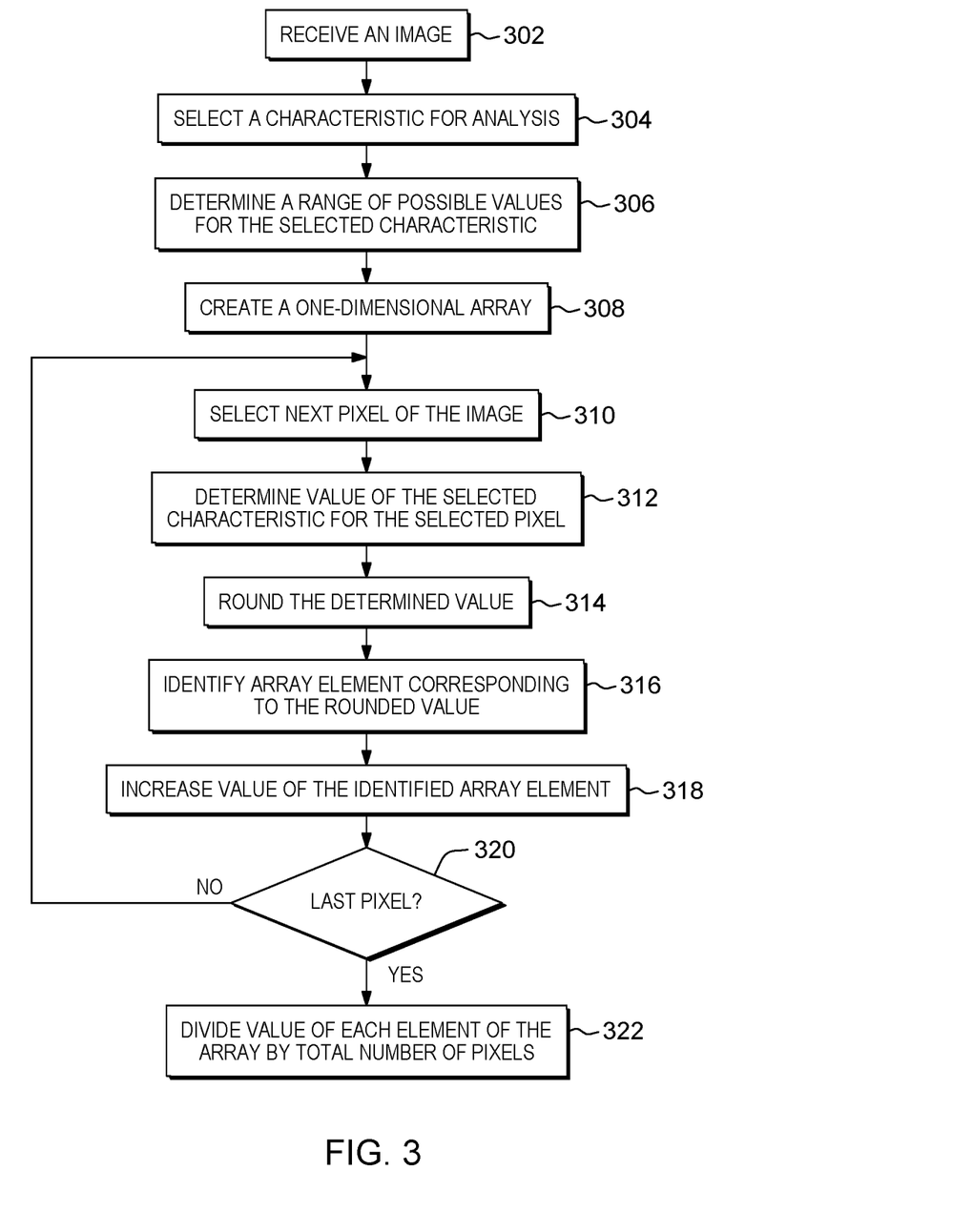
FIG. 3 is a flowchart of a method for analyzing a received image based on a selected characteristic, in accordance with embodiments of the present invention.

FIG. 3 is a flowchart of a method for analyzing a received image based on a selected characteristic, in accordance with embodiments of the present invention. In block 302, the processor 104 receives an image to be analyzed. In one embodiment, the processor may receive the image from the image store 110. The received image includes a plurality of pixels. Each pixel included in the analyzed image has a variety of characteristics associated therewith.

The characteristics of the received image (e.g., brightness, lightness, hue, saturation, intensity of red light, intensity of blue light, intensity of green light, etc.) based on the corresponding image coding model, such as, but not limited to, RGB, Cyan, Magenta, Yellow, and Black (CMYK), HSV, XYZ, CIELAB, and the like. According to an embodiment of the present invention, the disclosed image analysis process consists of the evaluation of all the pixels included in the received image, regardless of their location. The analysis is performed according to at least one aforementioned image characteristic. Advantageously, the disclosed analysis is identical for any of the selected characteristics.

In block 304, the processor 104 selects at least one image characteristic for the image analysis. In one embodiment, the characteristic for the analysis may be selected by a user. In an alternative embodiment, the processor 104 may automatically select a characteristic based on the type of the image to be analyzed. In one embodiment, the selected characteristic may include at least one of: saturation, lightness and toning hue.

According to embodiments of the present invention, the first stage of the analysis involves determining the distribution of all pixels of the image over the full range of possible values of the selected characteristic. Hereinafter, the analyzed image is represented by the letter I, and the characteristic selected for the analysis is represented by the letter X. In block 306, the processor 104 determines a range of possible values for the selected characteristic from $x_{min}$ to $x_{max}$. For example, for characteristic L of the CIELAB model, the range of possible values is the set [0; 100].

To calculate the distribution of the analyzed image pixels using the X characteristic, the processor 104 constructs a one-dimensional array (block 308). Elements of the constructed one-dimensional array correspond to discrete values of the selected characteristic—from its minimum possible value ($x_{min}$) to the maximum possible value ($x_{max}$) with an equal interval ("step"), hereinafter—dx. Length of the array constructed in block 308 (the number of elements in the array) is denoted by the letter N hereinafter. The array itself is denoted by the letter P, and the value of array's individual element is denoted by p(i), where i is the ordinal number of the element of the array P. The value of the selected characteristic X, which corresponds to the i-th element of the array P, is denoted as x (i). To determine the density of the distribution using the characteristic L, an array of 101 elements is created. The 1st element of the created array corresponds to the value L=0, the 2nd element corresponds to the value L=1, and so on with step=1. It is noted that before the start of the described herein image analysis, all elements of the created array are initialized to 0.

According to an embodiment of the present invention, in block 310, the processor 104 selects next pixel of the image to be analyzed. Next, in block 312, for the selected pixel of the image (hereinafter referred to as pix), the value of the analyzed characteristic (hereinafter –x(pix)) is calculated by the processor 104. In block 314, the processor 104 rounds the determined value. This rounded value, using rounding to a multiple of the "step," corresponds to one of the discrete values defined for each of the elements of the constructed array. Continuing with the exemplary characteristic L, for the selected pixel of the received image, the value of the characteristic L is calculated. Next, the calculated value is rounded to a multiple of the "step". When rounding, the processor 104 performs the calculation to the nearest discrete value (in the example with the characteristic L—to the nearest integer value), and a number located at the same distance from two adjacent discrete values is rounded off to the smallest value. For example, if the calculated value of the characteristic L of the analyzed pixel is 44.5—the processor 104 rounds it to 44. Consequently, the value of the 45th element of the array will be increased by 1, since the array for the characteristic L is constructed so that the counting starts from 0 with step 1 and the value L=44 falls on the 45th element of the array.

According to an embodiment of the present invention, in block 316, the processor 104 identifies the array element corresponding to the rounded value. In block 318, the processor 104 increases the value of the identified array element. More specifically, the processor 104 increases by 1 the value of the array element having an index equal to the rounded characteristic value of the analyzed pixel.

In step 320, the processor 104 determines whether the analyzed pixel comprises the last pixel of the image. In response to determining that the analyzed pixel is not the last pixel (decision block 320, "No" branch), the processor 104 repeats blocks 310-318 for all remaining pixels of the received image I. As a result, after processing all the pixels of the received image I (hereinafter, the total number of pixels is denoted by the letter Q), the sum of the values of all of the array elements is equal to the number of pixels of the received image I. The final step of the image analyzing procedure for the selected characteristic comprises the normalization of the values of the elements of the constructed array in order to bring it to the classical form, where the total distribution of the analyzed image pixels is equal to 1.

According to an embodiment of the present invention, in response to determining that the last pixel of the analyzed image was processed (block 320, "Yes" branch), in block 322, the processor 104 divides the value of each element of the array by the total number of pixels in the analyzed image. It should be noted, the sum of the values of all the elements of the array are equal to 1.

Figure 4:
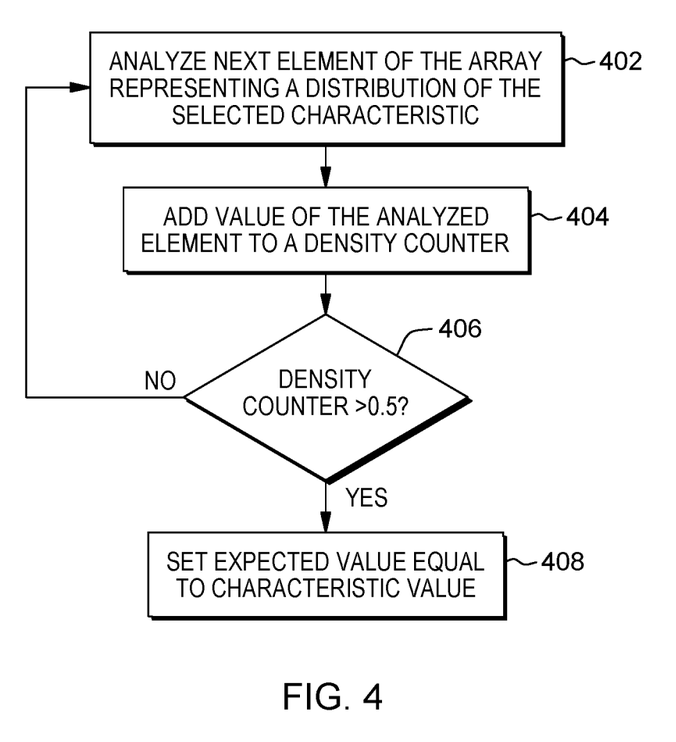
FIG. 4 is a flowchart of a method for analyzing distribution of the plurality of pixels of the received image using the selected characteristic function.

FIG. 4 is a flowchart of a method for analyzing distribution of the plurality of pixels of the received image using the selected characteristic function. The second stage of the analysis comprises the comparison of the distribution of the characteristic X obtained at the first stage (shown in FIG. 3) with the normal distribution, which is described by the formula of the Gaussian function:

$$f(x) = \frac{1}{\sigma\sqrt{2\pi}} e^{-\frac{(x-\mu)^2}{2\sigma^2}},$$

where $\mu$ is the expected value of the distribution and $\sigma$ is the standard deviation ($\sigma^2$ is the variance) of the distribution. The result of comparing the two distributions, as discussed below, enables the processor 104 to perform a quantitative assessment of the optimality of the analyzed image based on the selected characteristic X. It should be noted that in order to reliably compare both density distributions, the compared distributions first need to be reduced to a single scale and coordinate system. According to an embodiment of the present invention, this conformity is achieved by using the expected value and variance of the distribution of the characteristic X as parameters $\mu$ and $\sigma^2$ of the Gaussian function, respectively. The expected value of the distribution of the characteristic X, considering the discretization used at the first stage, is calculated not with absolute accuracy, but with some approximation, as discussed below.

In block 402, the processor 104 initializes variables utilized for calculation of the expected value. In one embodiment, the processor 104 initializes variables i and S to 0, where the variable i comprises a counter of the index of the current element of the array representing the distribution of the characteristic X and the variable S comprises the counter of the total density of the analyzed array elements. In addition, in block 402, the processor 104 analyzes the next element of the array representing the distribution of the selected characteristic, where i is the index of the analyzed element of the array.

According to an embodiment of the present invention, in block 404, the processor 104 adds the value of the analyzed element of the array to the counter of total density S (S=p(i)). In block 406, the processor 104 determines if the total density counter is greater than 0.5 (s >0.5). In response to determining that the total density counter does not exceed 0.5 (decision block 406, "No" branch), the processor 104 returns to block 402 and repeats it along with the block 404. In response to determining that the total density counter does exceed 0.5 (decision block 406, "Yes" branch), in block 408, the processor 104 sets the expected value to the value of the characteristic X corresponding to the analyzed element ($\mu$=X(i)).

The variance of the distribution density array of the characteristic X is calculated by the following formula:

$$D = \sqrt{\sum_{i=1}^{n} \frac{1}{n}(p(i) - \overline{p})^2},$$

where
D—variance;
p(i)—density value in the i-th element of the density array;
$\overline{p}$—average value of the array element;

$$\overline{p} = \frac{\sum_{i=1}^{n} p(i)}{n};$$

n—number of elements in the array

As a result, after calculating the expected value and variance, as noted above, the obtained values are substituted as parameters for the Gaussian function, $\mu$ and $\sigma^2$, respectively. This substitution of parameters enables comparison of the actual and normal distributions using the difference calculation formula (DIF) described below.

Figure 5:
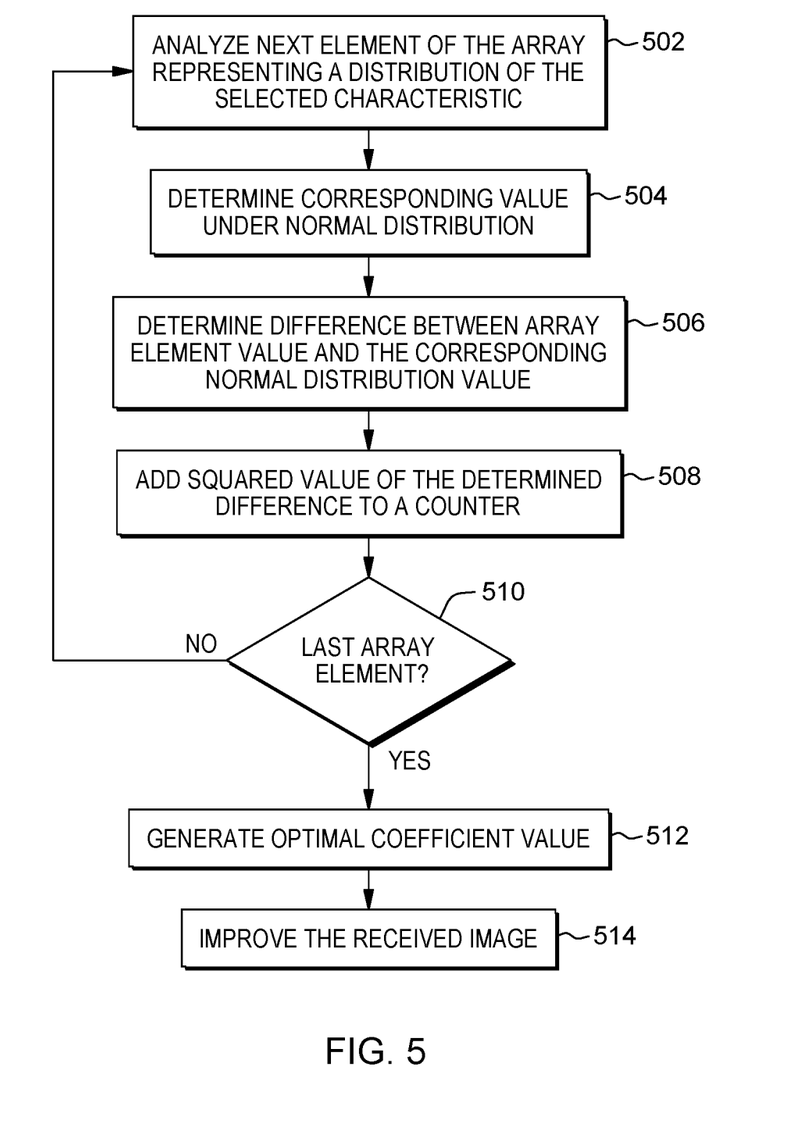
FIG. 5 is a flowchart of a method for comparing the analyzed distribution of the plurality of image pixels with a normal probability distribution function, in accordance with embodiments of the present invention.

FIG. 5 is a flowchart of a method for comparing the analyzed distribution of the plurality of image pixels with a normal probability distribution function, in accordance with embodiments of the present invention.

In block 502, the processor 104 initializes variables utilized for calculation of the expected value. In one embodiment, the processor 104 initializes variables i and S to 0, where the variable i comprises a counter of the index of the current element of the array P representing the distribution of the characteristic X ranging from $x_{min}$ to $x_{max}$ and the variable S comprises the counter of the total difference of all analyzed array elements. In addition, in block 502, the processor 104 analyzes the next element of the array representing the distribution of the selected characteristic, where i is the index of the analyzed element of the array and p(i) is the value of the characteristic X for i-th element of the array.

In block 504, the processor 104 determines corresponding value under normal distribution. In other words, the processor 104 determines value of the Gaussian function g(i) for x=x(i), where x(i) is the value of the selected characteristic X, which corresponds to the i-th element of the array. In block 506, the processor 104 determines the modulus difference dd(i) between the p(i) and g(i) values using the following formula:

$$dd(i)=|p(i)*100-g(i)*100|$$

In block 508, the processor 104 adds the squared value of the determined difference to the total squared differences counter between all elements:

$$S=S+dd(i)^2$$

In block 510, the processor 104 determines whether the analyzed element comprises the last element of the array. In response to determining that the analyzed element is not the last element (decision block 510, "No" branch), the processor 104 repeats blocks 502-508 for all remaining elements of the array.

According to an embodiment of the present invention, in response to determining that the last element of the analyzed array was processed (block 510, "Yes" branch), in block 512, the processor 104 generates the optimality coefficient value. In one embodiment, the processor first determines the mean square difference value using the following formula:

$$DIF = \sqrt{\frac{S}{n}}$$

and the optimality coefficient value is determined next using the mean square difference value:

$$Op = \frac{10}{DIF}$$

In block 514, the processor 104 improves the received image as described below.

In summary, the disclosed embodiments analyze an image as a set of pixels, each of which is classified based on the selected characteristic into the group that corresponds to the value of the selected characteristic. For example, a pixel with a lightness value of 13 is combined into a group called "13". Pixels with a lightness value of 27 are combined into a group called "27". And all pixels of the image are distributed in such groups. The number of such groups is equal to the number of possible values of the selected characteristic. Lightness characteristic, for example, has 101 possible values from 0 to 100. As a result, each group gets a certain number of pixels. The probability of finding a pixel in a particular group can be found by dividing the number of pixels in each group by the total number of pixels. The processor 104 calculates the expected value and the variance for the actual distribution. By substituting the resulting values into the formula of normal distribution, the processor 104 obtains the values in each group that the normal distribution function takes. The obtained normal distribution values are compared with the actual distribution values and the difference between corresponding values is determined for each group. In order to determine the mean square difference, the processor 104 squares off the determined differences, adds up these differences and divides them by the number of groups. The resultant mean square difference is divided by 10 to obtain the optimality coefficient value.

As noted above, in one embodiment, the selected characteristic may be a toning hue characteristic. The toning hue characteristic may be determined based on either the HSV or the LAB model.

In one embodiment, to determine the optimality coefficient value using the hue characteristic based on the HSV model, in a first stage, the hue value of each pixel is compared to integer value 210 to determine the minimum difference in the color space in terms of the hue component. Accordingly, the maximum difference can be only 180, when the pixel has a value of 30 according to the component H. Thus, each pixel acquires a value that allows to assign it to one of the 181 groups. The group with a value of 0 will get all pixels having the component H value of 210. The group with a value of 180 will get all pixels having the component H value of 30. In other words, all values may have a range of (0:180). Furthermore, the range (0:100) may be obtained by dividing the aforementioned range by 1.7921. Put differently, each step within the range of (0:100) corresponds to 1.7921 steps within the range (0:180). In one embodiment, all pixels may have characteristic H100 values ranging between 0 and 100.

The second stage of determining the optimality coefficient value involves determining the absolute deviation of the characteristic V (brightness in the HSV model) from the average value. In one embodiment, this characteristic may be referred to as deltaV. In this embodiment, each deltaV is equal to the difference between the value of 50 and the V value of each pixel, taken modulus. Accordingly, the deltaV characteristic may only have positive integer values ranging from 0 to 50.

According to an embodiment of the present invention, the toning hue characteristic (T) may be calculated based on the aforementioned characteristics using the following formula:

$T=H100+S-\text{deltaV}$

In this embodiment, the T characteristic has values ranging between −50 and 200. All pixels are distributed by this characteristic T into one of the 251 groups. In one embodiment, the processor 104 may calculate both the expected value and variance for the T characteristic as well. The optimality coefficient may be determined using the aforementioned algorithm for the characteristic T, instead of the characteristics S and/or L.

In another embodiment, the optimality coefficient value may be determined using the LAB model. Characteristics A and B in the LAB model may have values in the form of negative deviations from 0. The entire range of positive values of characteristic A may be divided into 50 equal steps. Each step is assigned a particular value: +1, +2, +3 . . . +50. Similarly, the entire range of negative values of characteristic A may be divided into 50 equal steps. Each step is assigned a particular value: −1, −2, −3 . . . −50. The range of values of the corresponding A characteristic is referred to herein as the "A100 range", and the value of each pixel in this range is called deltaA. The value of each pixel according to the characteristic A may be converted into a deltaA values ranging from −50 to +50. Similarly, the value of each pixel according to the characteristic B may be converted into a deltaB values ranging from −50 to +50.

The second stage of determining the optimality coefficient value involves determining the absolute deviation of the characteristic L from the average value. In one embodiment, this characteristic may be referred to as deltaL. In this embodiment, each deltaL is equal to the difference between the value of 50 and the L value of each pixel, taken modulus. Accordingly, the deltaL characteristic may only have positive integer values ranging from 0 to 50.

According to an embodiment of the present invention, the toning hue characteristic (T) may be calculated based on the aforementioned characteristics using the following formula:

$T=\text{deltaA}+\text{deltaB}-\text{deltaL}$

In this embodiment, the T characteristic has values ranging between −150 and 100. All pixels are distributed by this characteristic T into one of 251 groups. In one embodiment, the processor 104 may calculate both the expected value and variance for the T characteristic as well. The optimality coefficient may be determined using the aforementioned algorithm for characteristic T, instead of characteristics S or L. Generally, the larger the positive value of T, the more toned is the received image. The value of T equal to 0 indicates a neutral image.

Referring back to FIG. 5, in block 514, the processor 104 enhances the received image. In one embodiment, the image enhancement functionality is based on the values of the optimality coefficients calculated in block 512. In other words, the processor 104 performs enhancement of the received image after analyzing and evaluating the image and after calculating the coefficients of optimality.

According to an embodiment of the present invention, enhancement of the image may be based on two to three-dimensional deviation from two to three dimensional expected values. The disclosed method may utilize at least two characteristics of any color model described above. The image enhancement is illustrated below using the total deviation from the three-dimensional expected value.

According to an embodiment of the present invention, in block 514, for each selected characteristic, the processor 104 calculates the expected value. The expected value corresponding to three different characteristics is referred to hereinafter as "three-dimensional expected value" and is denoted by 3ev. Next, the processor 104 calculates the total deviation (Sddi) of the values of each pixel from the values of 3 ev using the formula:

$$Sddi = \sqrt{(L_2^* - L_{1*})^2 + (a_2^* - a_1^*)^2 + (b_2^* - b_1^*)^2}$$

where Sddi is the total deviation of the values of each pixel from the values of 3 ev. After calculating the total deviation, the processor 104 defines a range of possible values and a step. The minimal value of Sddi becomes 0 and the range of values is defined between 0 and the maximum value of Sddi. In other words, the range of Sddi values is divided by 101 steps from 0 to 100. The processor 104 calculates the coefficient of optimality of the image according to the three-dimensional method of the corresponding color model, as described above, with respect to block 512.

According to another embodiment of the present invention, correction of optimality coefficients may be performed based on a relative level of deviation from the expected value for the selected set of images. If the processor 104 compares more than one provided image, the actual distribution of expected values is calculated for each image using the two characteristics. According to embodiments of the present invention, the two characteristics of L and S reflect people's preferences unidirectionally. In other words, for all types of images, these two characteristics simultaneously have either a positive or negative correlation with the total subjective evaluations of the viewers evaluating the images.

If a pair of related characteristics is selected to analyze one or more images, for each image, the processor 104 calculates an adjustment factor for each optimality coefficient. In one embodiment, the adjustment factor (Cor1) is calculated using the following formula:

$$Cor1 = 1 - |1 - Av/Avi|,$$

where Av is the average expected value of the selected characteristic for all analyzed images, Avi is the expected value of the selected characteristic for a particular image, |1−Av/Avi| is the modulus of the standard deviation and where i may have a value from 2 to N, and where N represents the number of analyzed images.

According to an embodiment of the present invention, in order to enhance images, the optimality coefficients are multiplied by the calculated adjustment factor Cor1. As a result of this enhancement stage, the processor 104 obtains adjusted optimality coefficients for the two paired characteristics. It should be noted that values of the adjusted optimality coefficients can vary significantly. For example, the average value of the optimality coefficients for the L characteristic is usually higher than the average value of the optimality coefficients for the S characteristic. In the opposite case, the adjustment is performed by the characteristic S. In other words, in order to level the effect of the lightness characteristic and the saturation characteristic, the processor 104 performs the second adjustment to the larger of the two values as described below.

According to an embodiment of the present invention, for each image, the processor 104 calculates a second adjustment factor for each optimality coefficient for the selected pair of related characteristics using the following formulas:

$$Cor2 = AvL/AvS, \text{ where}$$

$$AvL = (Op1i + Op1i_{+1} + Op1i_{+2} \ldots Op1i_{+n})/n, \text{ and}$$

$$AvS = (Op4i + Op4i_{+1} + Op4i_{+2} \ldots Op4i_{+n})/n$$

According to an embodiment of the present invention, in order to further enhance images, the optimality coefficients are multiplied by the calculated adjustment factor Cor2 to obtain new optimality coefficients for the S characteristic. It should be noted that the disclosed method makes values of AvL and AvS substantially equal.

To determine the final value of relative optimality of each image to rank images based on their optimality coefficients, the processor 104 may choose either a maximum optimality coefficient or minimum optimality coefficient, based on the type of image being analyzed. According to an embodiment of the present invention, the processor 104 selects the maximum optimality coefficient if the analyzed characteristics have a positive correlation for the type of image being analyzed. For example, if the processor 104 analyzes landscape images, the maximum rule effectively identifies the optimal image according to the characteristics of L, S and T. However, if the processor 104 analyzes abstract paintings, the minimum rule effectively identifies the optimal image according to the characteristics of L, S and T. The characteristic more deviated from the average obscures the perception of the less deviated from the average characteristic. Accordingly, a more optimal characteristic, for example, "lightness" overshadows a less optimal characteristic—"saturation" in landscape images. When the processor 104 analyzes abstract paintings, for example, a less optimal characteristic—"saturation" overshadows the impression of a more optimal characteristic—"lightness".

As described above, out of the two aligned series of coefficients, the processor 104 chooses a maximum optimality coefficient value or a minimum optimality coefficient value for each image. In one embodiment, the processor also ranks all images according to the value of the selected coefficient depending on the type of correlation: positive or negative. If the type of the analyzed images have positive correlation, then the images are ranked from the highest value (indicating the most pleasant image) to the lowest value (indicating the most unpleasant image).

According to embodiments of the present invention, even the selected optimal image may be improved by the processor 104. During the image improvement/enhancement step, the processor 104 performs a permanent calculation of the percentage of improved (modified) pixels relative to the total number of pixels in the corresponding image. According to embodiments of the present invention, the processor 104 may apply one of the following image improvement techniques, based on the type of the image being analyzed: Lp, Ln, Sp, Sn.

Image Enhancement on the Characteristic L in the Color Model LAB (Lp).

As shown in FIG. 5, in block 506, the processor 104 determines the modulus difference dd(i) between the p(i) and g(i) values, where dd(i) represents the difference in distribution between the actual distribution values and the normal distribution values for each step of the selected characteristic values (from 0 to 100).

DL Rule—Distribution, Determination of the Maximum and Determination of the Number of Extra Pixels or Number of Insufficient Pixels.

In one embodiment, the processor 104 implements the DL rule by distributing all groups of pixels of the analyzed image according to the value of the square of the difference $ddi^2$ from the largest to the smallest. First, the processor 104 determines the group with the largest $ddi^2$. The value of the selected characteristic of this group is denoted as Xi hereinafter. Second, the processor 104 compares the number of pixels in the group Xi with the number of pixels in this group according to the normal distribution function (pi−gi=ddi). In response to determining that ddi is negative (pi is less than gi), the processor applies the NL Rule (see below). In response to determining that ddi is positive (pi is greater than gi), the processor applies the PL Rule (see below).

PL Rule—Distribution of Extra Pixels in Neighboring Groups.

In one embodiment, the processor 104 implements the PL rule by distributing all pixels of this group (with the largest $ddi^2$) according to the square of the difference of each pixel characteristic value before rounding (in block 314 of FIG. 3) and the value of Xi. The plurality of pixels with the largest squares of the difference ($ddi^2$) comprise a group of extra pixels that should be adjusted based on the selected characteristic L. This group is denoted by the letter E (extra) hereinafter. The processor 104 generates this group by first selecting the pixel with the largest difference square value, then selecting the pixel with the largest remaining difference square value, and so on until the entire group is generated. Next, the processor 104 divides the group E into two subgroups. The first subgroup includes all pixels having the characteristic L values ranging between Xi and Xi−1 values. The second subgroup includes all pixels having the characteristic L values ranging between Xi and Xi+1 value. According to an embodiment of the present invention, for the pixels of the first subgroup, the processor 104 changes the value of the characteristic L from the actual value to the value Xi−1. For the pixels of the second subgroup, the processor 104 changes the value of the characteristic L from the actual value to the value Xi+1. It should be noted that if Xi has only one neighboring group (e.g., the group being analyzed is one of the two respective ending groups with values of 0 and 100, respectively), then the division into two subgroups is not performed by the processor 104. If Xi is equal to 0, the processor 104 changes the value of the characteristic L for all pixels of the group E from the actual value to the value 1. If Xi is equal to 100, the processor 104 changes the value of the characteristic L for all pixels of the group E from the actual value to the value 99.

As noted above, if, as a result of applying the DL Rule, the processor 104 obtains the negative value of ddi (pi less than gi), then the processor 104 applies the NL Rule instead of the PL rule.

NL Rule—Collection of Missing Pixels from Neighboring Groups

In one embodiment, the processor 104 implements the NL rule by selecting into one subgroup of pixels (from all of the pixels of two neighboring groups with a characteristic value of Xi+1 and Xi−1) only those pixels that have characteristic L values before rounding (in block 314 of FIG. 3) between Xi−1 and Xi+1. Next, the processor 104 distributes all pixels of this subgroup according to the square of the difference of each pixel's characteristic value before rounding (in block 314 of FIG. 3) and the value of Xi. The plurality of pixels with the smallest (minimal) squares of the difference ($ddi^2$) taken modulus comprise a group of missing pixels that should be adjusted based on the characteristic L. It should be noted that if there is an insufficient number of pixels in two neighboring groups, the processor 104 may analyze the two following groups (e.g. groups Xi−2 and Xi+2 next). The processor 104 continues this process until it accumulates ddi number of pixels or until it reaches the limit of the analyzed range of values. This group is denoted by the letter M (missing) hereinafter.

According to an embodiment of the present invention, for all the pixels comprising the group M, the processor 104 changes the value of the characteristic L from the actual value to the value Xi.

It should be noted that if Xi has only one neighboring group (e.g., the group being analyzed is one of the two respective ending groups with values of 0 and 100, respectively), then the processor 104 uses only pixels of the one neighboring group in this rule. If Xi is equal to 0, the processor 104 changes the value of the characteristic L for all pixels of the group M from the actual value to the value 0. If Xi is equal to 100, the processor 104 changes the value of the characteristic L for all pixels of the group M from the actual value to the value 100.

According to an embodiment of the present invention, the processor 104 repeats application of the rules DL, PL and NL. If at any iteration of the application of the rules, the largest group is selected by the square of the difference ddi2 (Rule DL) and this group of pixels has already been changed, the image improvement process is terminated, and the image is considered as enhanced as possible. If at any particular iteration of the rule application, the largest group is selected by the square of the difference ddi2 (Rule DL) and it turns out that there are two or more groups (values in these groups are equal to each other and those values are maximum values as compared to other groups), then the first group that is chosen is the one that is farther from the expected value μ.

Image Enhancement on the Characteristic L in the Color Model LAB (Ln).

In this case, the processor 104 applies the DL rule. However, this time the processor 104 starts with a group of pixels having the smallest value ddi2. This group of pixels is denoted as ddmin hereinafter. The groups with the next closest ddi values are denoted as ddmin+1, ddmin+2, and so on. Next, the processor 104 compares the number of pixels in the group Xi with the number of pixels in this group according to the normal distribution function (pi−gi=ddi). In response to determining that the ddi value is negative (pi is less than gi), the processor applies the NL2 Rule (see below). In response to determining that the ddi value is positive (pi is greater than gi), the processor applies the PL2 Rule (see below).

PL2 Rule—Collection of Extra Pixels from Neighboring Groups.

In one embodiment, the processor 104 generates a subgroup from all the pixels of two neighboring groups with a L characteristic value of Xi+1 and Xi−1, by selecting only those pixels that have L values before rounding between Xi+1 and Xi−1. Next, the processor 104 distributes all pixels of this group according to the square of the difference of each pixel characteristic value before rounding (in block 314 of FIG. 3) and the value of Xi. According to an embodiment of the present invention, for the pixel having the smallest $ddi^2$ value, the processor 104 changes the value of the characteristic L from the actual value to the value Xi. Then, for the pixel having the next $ddi^2$ value, the processor 104 changes the value of the characteristic L from the actual value to the value Xi. It should be noted that this adjustment process continues until the number of adjusted pixels does not exceed ddmin+1.

It should be noted that if Xi has only one neighboring group (e.g., the group being analyzed is one of the two respective ending groups with values of 0 and 100, respectively), then the processor 104 uses only pixels of the one neighboring group in this rule. If Xi is equal to 0, the processor 104 changes the value of the characteristic L for all pixels of the generated subgroup from the actual value to the value 0. If Xi is equal to 100, the processor 104 changes the value of the characteristic L for all pixels of the generated subgroup from the actual value to the value 100.

According to an embodiment of the present invention, the processor 104 repeats application of the rules DL, PL2 and NL2. If at any iteration of the application of the rules, the smallest group is selected by the square of the difference ddi2 (Rule DL) and this group of pixels has already been changed, the image improvement process is terminated, and the image is considered as enhanced as possible. If at any particular iteration of the rule application, the largest group is selected by the square of the difference ddi2 (Rule DL) and it turns out that there are two or more groups (values in these groups are equal to each other and those values are minimum values as compared to other groups), then the first group that is chosen is the one that is closest to the expected value μ.

NL2 Rule—Distribution of Extra Pixels Among Neighboring Groups

In one embodiment, the processor 104 implements the NL2 rule by distributing all pixels of this group according to the square of the difference of each pixel characteristic value before rounding (in block 314 of FIG. 3) and the value of Xi. In this case, the processor 104 starts with the pixel having the largest value of $ddi^2$. If the L characteristic value of that pixel lies in the range between Xi and Xi−1, the processor 104 changes the value of the characteristic L for this pixel to Xi−1. Then, for all pixels having the L characteristic value falling in the range between Xi and Xi+1, the processor 104 changes the value of the characteristic L from the actual value to the value Xi+1. The processor 104 continues this process until the number of adjusted pixels exceeds ddmin+1.

It should be noted that if Xi is equal to 0, the processor 104 changes the value of the characteristic L for all pixels of the generated subgroup from the actual value to the value 1. If Xi is equal to 100, the processor 104 changes the value of the characteristic L for the corresponding pixels from the actual value to the value 99.

According to an embodiment of the present invention, the processor 104 repeats application of the rules DL, PL2 and NL2. If at any iteration of the application of the rules, the smallest group is selected in terms of the square of the difference ddi2 value (Rule DL) and this group of pixels has already been changed, the image improvement process is terminated, and the image is considered as enhanced as possible.

According to embodiments of the present invention, the processor 104 may apply similar rules for improving images based on the S characteristic and based on the T characteristic. In these cases, the processor 104 adjusts the S characteristic value or the T characteristic value instead of the L characteristic value.

It should be noted that foregoing embodiments are not limited to image files. In various embodiments, the processor 104 may be configured to determine the optimality coefficient for a sound file or a video file.

A digital sound file consists of a set of indivisible parts that have two characteristics: sound frequency and amplitude of the sound. The frequency defines the pitch of the sound, and amplitude defines the volume of the sound. In one embodiment, the processor 104 analyzes both characteristics of the sound to determine optimality coefficients. The combination of optimality coefficients determines the overall optimality coefficient of the sound file. In one embodiment, the combination may be a simple addition of the two optimality coefficients. In another embodiment, the processor 104 may select the highest of the two optimality coefficients as the optimality coefficient of the sound file. It should be noted that the processor 104 may be configured to process different types of digital sound files including but not limited to, classical music, rock music, alarmic sounds and the like. In various embodiments, depending on the type of the sound file, its purpose and consumer stratum, the processor 104 may select an appropriate combination of the generated optimality coefficients of the corresponding sound files. The foregoing techniques for improving image files can be applied to sound characteristics in order to improve digital sound files.

As noted above, at least in some embodiments, the processor 104 may be configured to determine the optimality coefficient for a video file. Each video file consists of a series of frames that play at a specific frequency per second (24 frames, 29 frames per second, for example). In addition, the video file contains an audio track, which can be separated into a separate audio file and analyzed as described above. Various embodiments of the present invention contemplate a variety of methods for analyzing the video file in order to determine the optimality coefficient.

A video file is a plurality of pixels of each frame that is combined with a plurality of pixels of all other frames of the corresponding video file. In one embodiment, the processor 104 analyzes all pixels of the video file. The processor 104 may apply the aforementioned analysis techniques for the characteristics of L and S for image files to video files. In the case of video files, the plurality of pixels comprises not one image, but N frames multiplied by the number of pixels in each frame. In this embodiment, the processor may determine two different optimality coefficients Op1v and Op2v corresponding to the characteristics L and S.

In another embodiment, the processor 104 may analyze a video file by treating one frame (one image) as a pixel of one image. When the processor 104 analyzes the image, it divides the image into a plurality of indivisible pieces—pixels. When the processor 104 analyzes video files, the processor 104 divides the entire video file into multiple frames and treats them as indivisible pieces. These frames have their own characteristics in the form of expected values for L and S characteristics. Each frame comprises an image that can be analyzed as described above, and the expected value is determined, for example, based on the L characteristic. As a result, the processor 104 determines the expected values L of each frame. Next, the techniques described above as applied to a plurality of pixels may be applied to a plurality of frames instead to calculate the optimality coefficient for a video file based on the L characteristic. This optimality coefficient is denoted as OpLv herein.

According to an embodiment of the present invention, the processor 104 also determines the optimality coefficient based on the saturation characteristic S. This optimality coefficient is denoted as OpSv. In yet another embodiment, the processor 104 calculates optimality coefficients for each frame based on three characteristics L, S and T. Next, the processor 104 applies the techniques described above to a plurality of frames instead of a plurality of pixels. In one embodiment of the present invention, the processor 104 may also calculate the derivative optimality coefficients of the video file based on the L, S and T characteristics, OpLv2, and OpSv2 and OpTv2. In other words, the processor 104 may generate 10 different optimality coefficients: 8 associated with the video frames and 2 associated with the sound portion of the video file. According to embodiments of the present invention, an appropriate combination of optimality coefficients may be calculated by the processor 104, depending on the type of video file being analyzed. For example, the four aforementioned techniques (Lp, Ln, Sp, Sn) may be used for enhancing the video file.

According to an embodiment of the present invention, the processor 104 may determine optimality coefficient for images of real objects (as opposed to abstract images) using the standard deviation value and a derivative coefficient of optimality. The standard deviation value (the sigma value) is the square root of the variance, which is calculated for the actual distribution.

According to an embodiment of the present invention, in order to calculate a derivative optimality coefficient, a plurality of values ddi are represented as a set of elements with characteristic Y. Each element of the set has its own characteristic Y, equal to the value ddi. It should be noted that this ddi value could be either negative or positive. According to an embodiment of the present invention, calculation of the derivative coefficient may involve distribution of pixels having this Y characteristic along the horizontal axis. In one embodiment, pixels having negative values may be placed on the left side of the axis, while pixels having positive values may be placed on the right side of the axis. Next, the processor 104 applies the techniques described above to this distribution of pixels. However, the derivative optimality coefficient values are determined based on the mean square difference values using the following formula:

$$Opd = \frac{100}{DIF}$$

For each characteristic X (L, S and T) described above, the processor 104 calculates a secondary (derivative) optimality coefficient. These derivative optimality coefficients can be referred to as Opd1, Opd2 and Opd3, for example. According to embodiments of the present invention, the derivative optimality coefficients can be combined with primary coefficients by applying a variety of mathematical operations including, but not limited to, addition, multiplication, subtraction, division, and the like.

In one embodiment, optimality coefficient for images of real objects (OpR) may be calculated using the following formula:

$$OpR = Op + \sigma(\text{standard deviation}) + Opd$$

The higher the value of this coefficient, the more pleasant the image. In other words, there is direct correlation between the value of the OpR coefficient and the pleasantness of images of real objects.

Figure 6:
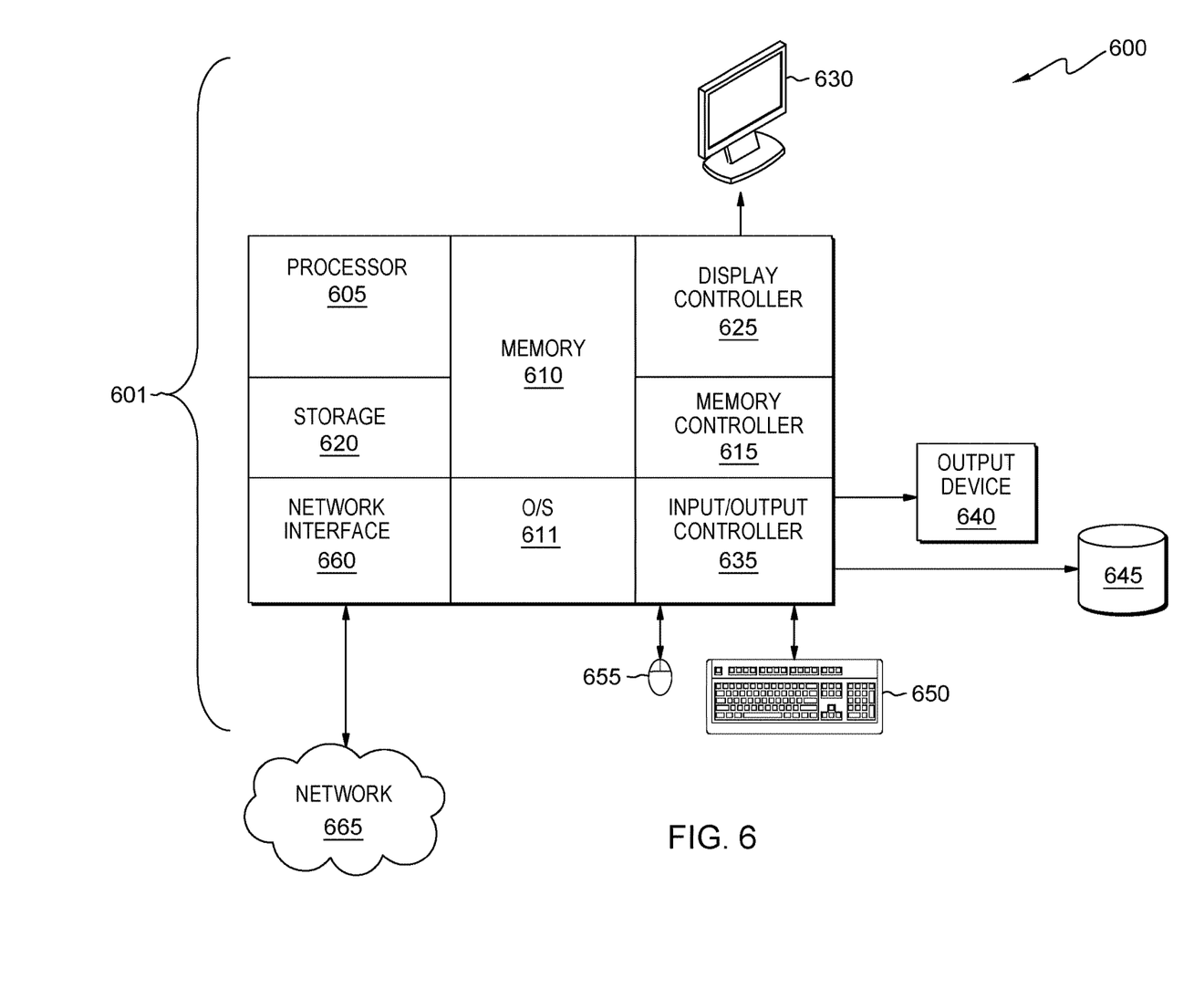
FIG. 6 illustrates a computer system for image processing in accordance with one or more embodiments of the present invention.

FIG. 6 illustrates a computer system for image processing and enhancement in accordance with one or more embodiments of the present invention.

Turning now to FIG. 6, a computer system for image processing and enhancement, such as the image processing device 102 in FIG. 1, is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In one or more exemplary embodiments of the present invention, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

In accordance with one or more embodiments of the present invention, the memory 610 may include multiple logical partitions (LPARs) each running an instance of an operating system. The LPARs may be managed by a hypervisor, which may be a program stored in memory 610 and executed by the processor 605.

In one or more exemplary embodiments of the present invention, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630.

In one or more exemplary embodiments of the present invention, the system 600 can further include a network interface 660 for coupling to a network 665. The network 665 can be an IP-based network for communication between the computer 601 and any external server, client and the like via a broadband connection. The network 665 transmits and receives data between the computer 601 and external systems, such as the external processing device 108 of FIG. 1. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining an optimality coefficient, the method comprising:
   receiving an image comprising a plurality of pixels;
   selecting a characteristic function for analyzing the received image;
   analyzing distribution of the plurality of pixels of the received image using the selected characteristic function;
   comparing the analyzed distribution of the plurality of pixels with a normal probability distribution function, wherein the normal probability distribution function comprises a Gaussian distribution;
   determining a difference between the analyzed distribution of the plurality of pixels and the normal probability distribution function; and
   generating an optimality coefficient value for the received image based on the determined difference.

2. The method of claim 1, wherein the characteristic function is selected from at least lightness of the received image, saturation of the received image and toning hue of the received image.

3. The method of claim 1, wherein analyzing distribution of the plurality of pixels further comprises:
   classifying the plurality of pixels of the received image into a plurality of groups based on values of the selected characteristic function associated with a corresponding pixel;
   determining probability of each pixel of the plurality of pixels belonging to a particular group of the plurality of groups; and
   determining an expected value and variance for each of the plurality of groups.

4. The method of claim 3 further comprising substituting an expected value of the normal probability distribution function with the determined expected value and substituting variance of the normal probability distribution function with the determined variance.

5. The method of claim 1 further comprising enhancing the received image by redistributing the plurality of pixels based on the generated optimality coefficient value.

6. The method of claim 1, further comprising:
   receiving a sound file comprising a plurality of components;
   selecting a characteristic function for analyzing the received sound file;
   analyzing distribution of the plurality of components of the received sound file using the selected characteristic function;

comparing the analyzed distribution of the plurality of components with a normal probability distribution function, wherein the normal probability distribution function comprises a Gaussian distribution;

determining a difference between the analyzed distribution of the plurality of pixels and the normal probability distribution function; and generating an optimality coefficient value for the received sound file based on the determined difference.

7. The method of claim 6, wherein the characteristic function is selected from at least frequency of the sound and amplitude of the sound.

8. The method of claim 1, wherein receiving the image further comprises receiving a video file comprising a plurality of frames, wherein the characteristic function is selected for analyzing the received video file and wherein analyzing distribution of the plurality of pixels further comprises analyzing distribution of the plurality of frames.

9. The method of claim 8, wherein comparing the analyzed distribution of the plurality of pixels further comprises comparing the analyzed distribution of the plurality of frames with the normal distribution and wherein generating the optimality coefficient value comprises generating the optimality coefficient value for the received video file.

10. A system for determining an optimality coefficient, the system comprising: at least one processor; and at least one memory storing computer-executable instructions, wherein the at least one processor is configured to access the at least one memory and execute the computer-executable instructions to:
receive an image comprising a plurality of pixels;
select a characteristic function for analyzing the received image;
analyze distribution of the plurality of pixels of the received image using the selected characteristic function;
compare the analyzed distribution of the plurality of pixels with a normal probability distribution function, wherein the normal probability distribution function comprises a Gaussian distribution;
determine a difference between the analyzed distribution of the plurality of pixels and the normal probability distribution function; and
generate an optimality coefficient value for the received image based on the determined difference.

11. The system of claim 10, wherein the characteristic function is selected from at least lightness of the received image, saturation of the received image and toning hue of the received image.

12. The system of claim 10, wherein the at least one processor configured analyze distribution of the plurality of pixels is further configured to:
classify the plurality of pixels of the received image into a plurality of groups based on values of the selected characteristic function associated with a corresponding pixel;
determine probability of each pixel of the plurality of pixels belonging to a particular group of the plurality of groups; and
determine an expected value and variance for each of the plurality of groups.

13. The system of claim 12, wherein the at least one processor is further configured to substitute an expected value of the normal probability distribution function with the determined expected value and substitute variance of the normal probability distribution function with the determined variance.

14. The system of claim 10, wherein the at least one processor is further configured to enhance the received image by redistributing the plurality of pixels based on the generated optimality coefficient value.

15. The system of claim 10, wherein the at least one processor is further configured to:
receive a sound file comprising a plurality of components;
select a characteristic function for analyzing the received sound file;
analyze distribution of the plurality of components of the received sound file using the selected characteristic function;
compare the analyzed distribution of the plurality of components with a normal probability distribution function, wherein the normal probability distribution function comprises a Gaussian distribution; and
generate an optimality coefficient value for the received sound file based on the determined difference.

16. The system of claim 15, wherein the characteristic function is selected from at least frequency of the sound and amplitude of the sound.

17. The system of claim 10, wherein the at least one processor configured to receive the image is further configured to receive a video file comprising a plurality of frames, wherein the characteristic function is selected for analyzing the received video file and wherein the at least one processor configured to analyze distribution of the plurality of pixels is further configured to analyze distribution of the plurality of frames.

18. A computer-program product for determining an optimality coefficient, the computer-program product comprising a computer-readable storage medium having program instructions embodied therewith, the program instructions executable by a processor to cause the processor to perform a method comprising: receiving an image comprising a plurality of pixels; selecting a characteristic function for analyzing the received image; analyzing distribution of the plurality of pixels of the received image using the selected characteristic function; comparing the analyzed distribution of the plurality of pixels with a normal probability distribution function, wherein the normal probability distribution function comprises a Gaussian distribution; determining a difference between the analyzed distribution of the plurality of pixels and the normal probability distribution function; and generating an optimality coefficient value for the received image based on the determined difference.

* * * * *